United States Patent [19]

Lecheheb et al.

[11] Patent Number: 4,771,297

[45] Date of Patent: Sep. 13, 1988

[54] INK JET DROPLET GENERATOR WITH QUICK-RELEASE NOZZLE CAP

[75] Inventors: Ammar Lecheheb, Suffolk; James J. Doyle, Cambridge, both of England

[73] Assignee: Domino Printing Sciences PLC, Cambridge, England

[21] Appl. No.: 3,817

[22] Filed: Jan. 16, 1987

[30] Foreign Application Priority Data

Feb. 4, 1986 [GB] United Kingdom ................ 8602647

[51] Int. Cl.[4] ........................................ G01D 15/16

[52] U.S. Cl. ................................ 346/140 R; 346/75

[58] Field of Search .................... 346/140 IJ, 140 PD, 346/75

[56] References Cited

U.S. PATENT DOCUMENTS 4,054,883 10/1977 Ozone ................................ 346/141
4,184,169 1/1980 Taylor .......................... 346/140 PD
4,364,059 12/1982 Nagayama ...................... 346/140 IJ
4,429,317 1/1984 Umezawa ...................... 346/140 IJ

*Primary Examiner*—E. A. Goldberg
*Assistant Examiner*—Mark Reinhart
*Attorney, Agent, or Firm*—Robbins & Laramie

[57] ABSTRACT

A piezo-electric ink jet droplet generator (1) has a body part (2) having a first ink supply passage (10/11) and a second ink supply passage (12) extending generally perpendicularly therefrom through a protrusion (20) of the body and opening at an end face (14) of the protrusion. A piezo-electric crystal (6) is attached to a surface of the body closely spaced from the first ink supply passage and adjacent the end of the second ink supply passage which connects with the first supply passage. A nozzle (17) is mounted in a cap (3) which is secured to the end of the protrusion (20), the nozzle being in alignment with the second supply passage (12). The inner surface (13) of the cap surrounding the nozzle is spaced from the end face (14) of the protrusion thereby forming, in use, a disk (21) of ink between the inner face of the cap and the end face of the protrusion. The cap is sealed to the protrusion by means of a flexible seal (16) and engaged with the protrusion by means of a quick-release coupling (9,19).

6 Claims, 1 Drawing Sheet

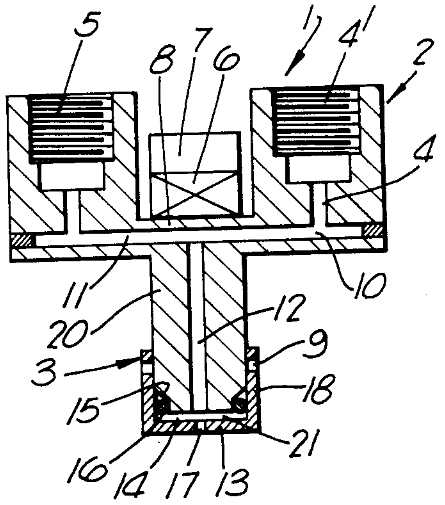
Fig. 1.
Fig. 2.
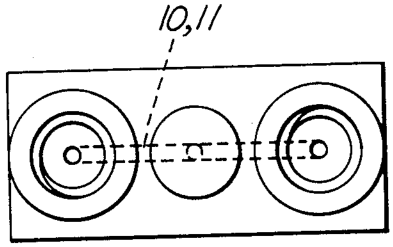
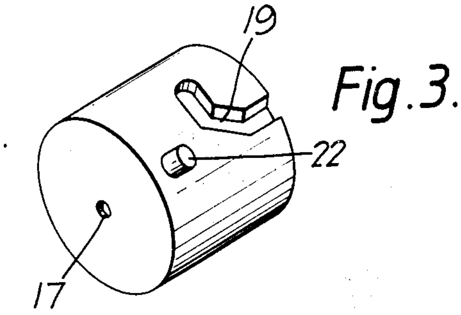
Fig. 3.
Fig. 4.
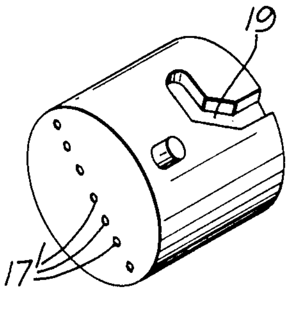

INK JET DROPLET GENERATOR WITH QUICK-RELEASE NOZZLE CAP

The present invention relates to ink jet droplet generators and more particularly to a droplet generator for use in a continuous ink jet printing system, droplets being formed at a nozzle by vibration of a piezo-electric crystal.

Many different types of ink jet droplet generator are known. For example, U.S. Pat. No. 3,512,172 shows a droplet generator having a pair of hollow cylindrical piezo-electric crystals which expand and contract to cause corresponding elongation and contraction of a tubular nozzle housing surrounded by the piezo-electric crystals, the nozzle housing having a jewel nozzle permanently and rigidly fixed at the free end of the nozzle tube. A particular problem with this type of nozzle and with many others is that when blockage of the nozzle occurs the droplet generator has to be substantially completely disassembled for cleaning.

U.S. Pat. No. 4,032,928 describes a droplet generator actuated by a piezo-electric crystal, the vibrational energy from which is transmitted to the ink through a diaphragm. The droplet generator is assembled by bolts which extend through the major components and again, this requires virtually complete disassembly in order to clear any blockage of the nozzle.

Various other droplet generators are known, comprising various resonant components. Frequently a conical or horn shaped cavity is provided, but these shapes are required to be manufactured to a very high degree of accuracy in order to achieve efficient drop generation.

The actual nozzle of such droplet generators usually comprises an apertured jewel fixed in a supporting member which is, in turn, rigidly fixed to the main body of the droplet generator either by being bolted or cemented to it. It has been suggested to fix the nozzle support to the body by forming it as the end face of a screw cap which can then be screw-threaded to the body, but this requires precise torqueing of the screw cap to the body in order to ensure efficient and accurate droplet generation and any inaccuracy in tightening the screw cap on the body results in inconsistency of the break-up in the stream of the droplets due to the changes in the resonant characteristics.

In other prior art generators vibrational power may be transmitted to the ink via a diaphragm which also serves as a barrier between the conducting ink and the piezo-electric crystal. U.S. Pat. No. 3,683,396, U.S. Pat. No. 4,065,774 and U.S. Pat. No. 4,290,074 describe other droplet generators having either a resonating ink column or resonating mechanical parts or both.

Prior art droplet generators are either complex in assembly, require high accuracy in assembly, are difficult to clean out, or suffer from more than one of these disadvantages.

According to the present invention there is provided a piezo-electric ink jet droplet generator comprising a body part having a first ink supply passage; a second ink supply passage extending generally perpendicularly therefrom through a protrusion of the body and opening at an end face of the protrusion; a piezo-electric crystal attached to a surface of the body closely spaced from the first ink supply passage and adjacent the end of the second ink supply passage which connects with the first supply passage; and a nozzle mounted in a cap secured to the end of the protrusion, the nozzle being in alignment with the second supply passage and the inner surface of the cap surrounding the nozzle being spaced from the end face of the protrusion thereby forming, in use, a disk of ink between the inner face of the cap and the end face of the protrusion, the cap being sealed to the protrusion by means of a flexible seal and engaged with the protrusion by means of a quick-release coupling.

Preferably, the quick-release coupling comprises a bayonet type coupling, pins being formed either on the cap or on the protrusion and engaging with respective slots formed on the protrusion or cap respectively.

Advantageously the first ink supply passage and the second ink supply passage form together a substantially T shaped passage, the leg of the T providing the second ink supply passage. By this means, at one end of the cross bar of the T the first ink supply passage may be connected to an inlet port in the body and at the other end a bleed or flushing port may be provided. The piezo-electric crystal is preferably positioned axially above the second supply passage and is separated by a thin wall of the body from the first supply passage.

Such a droplet generator is not only robust, compact and simple to manufacture whilst still being capable of breaking up a jet of ink both efficiently and stably, but can also readily be partly disassembled for clearing any nozzle blockage that arises in use.

Attaching the nozzle cap to the body by means of a bayonet coupling also has an advantage over nozzle caps which are attached by screw-threads in that the possibility of nozzle blockage due to particles originating from the action of threading the cap on the body is eliminated.

An example of a droplet generator constructed in accordance with the present invention and a modification will now be described with reference to the accompanying drawings in which:

FIG. 1 is an axial cross-sectional view of a droplet generator;

FIG. 2 is a plan view;

FIG. 3 is an isometric view of a first nozzle cap; and,

FIG. 4 is a similar view of a second nozzle cap.

FIG. 1 shows a droplet generator 1 which comprises a main body part 2 and a nozzle cap 3. The main body 2 has a generally T-shaped ink supply system comprising first 10/11 and second 12 ink supply passages, the first passage 10/11 being fed from an inlet passage 4 leading from an inlet port 4'. At the other end of the supply passage 10/11 a flushing port or bleed port 5 is provided either for flushing ink through the supply passage 10/11 or for bleeding air from the generator. The passage 10/11 is formed as a cylindrical passage of small diameter, in the particular embodiment shown, 1.2 mm.

Between the inlet port 4 and bleed port 5 a piezo-electric crystal 6 is secured, by cementing, to the body, the crystal 6 having a backing element 7 of the same diameter. The wall of the supply passage 10/11 between the passage and the piezo-electric crystal 6 is made as thin as possible in order to enable the transfer of vibrational energy from the crystal in use, and in the present example the thickness of the wall is 500 μm. The piezo-electric crystal is preferably bonded to the body and to the backing element 7 by using golden epoxy or the like and the element 7 is preferably made of a material having a high acoustic impedance, e.g. stainless steel.

In order to mount the generator in the chassis of a print head, it is fixed at the flange 8 and in order to provide for secure fixing it is important that the mechanical reactances at the interfaces between the flange 8 and the piezo-electric crystal 6 and also between the backing element 7 and the piezo-electric crystal 6 cancel each other so that there is no relative movement between the respective interfaces and so that there is no vibrational loss through the flange 8. This enables the flange 8 to form a region or zone of substantially infinite mechanical impedance enabling the droplet generator to be fixed at this region without the fear of energy being dissipated to the print head.

It has been found that this may be accomplished specifically by making the thickness of the backing element and piezo-electric crystals equal respectively to λ/10 and λ/11 at the operating frequency, λ being the ultrasonic wavelength in the material under consideration.

The nozzle cap 3 has an apertured jewel nozzle 17 securely mounted generally centrally in an end wall 13 and has a cylindrical side wall 18. The side wall 18 has a pair of opposed cam slots 19 (see FIGS. 3 and 4) which engage with respective diametrically opposed pins 9 which extend from the cylindrical wall of the protrusion 20 through which the second supply passage 12 extends.

The end face 14 of the protrusion 20 has a conical taper 15 to enable the seating of a flexible O-ring 16 to seal the nozzle cap 3 to the protrusion 20. The position of the pins 9 and cam slots 19 is such that a gap 21 is formed between the end face 14 of the protrusion 20 and the end wall 13 of the nozzle cap 3 to provide a disk of ink in use.

Preferably, the two ends of the first supply passage 10/11 are formed so that their respective lengths are equal to a quarter of the wavelength of the ultrasonic vibrations in the printing fluid in order that energy is not allowed to be dissipated through the first supply passage and is instead directed towards the second supply channel 12. This contributes to the efficient breaking up of the exiting jet. Preferably the passage 12 has a diameter or width equal to or narrower than the passage 10/11 in order to amplify disturbance of the ink due to vibration of the piezo-electric crystal and the channel 12 is preferably of a resonant length in the printing fluid at the operating frequency (in the present case about 18 mm (0.01847 m) with a water-based ink having a speed of sound therein of 1575 $m.s^{-1}$, at an operating frequency of 64 kHz).

Use of the bayonet coupling and O-ring between the nozzle cap 3 and the protrusion 14 avoids the problem of having to use torque wrenches or the like for detachable nozzle caps and the nozzle cap 3 is also effectively decoupled from the ultrasonic vibration of the body 2. This arrangement ensures that the droplet generator will operate over a wide band of exciting vibrations and be tolerant to mechanical defects and changes in the operating conditions.

In the embodiment shown the thickness of the disk of ink formed between the end of the protrusion 20 and the nozzle cap 3 has been calculated by equating the inertial force of the cap to the compressional force exerted by the acoustic waves in the ink 14. In the example of a droplet generator operating at 64 kHz this thickness was found to be equal to 350 μm.

The nozzle cap 3 may have a protrusion 22 to provide an indication of the correct orientation for mounting of the cap on the protrusion 20 and in the alternative embodiment shown in FIG. 4 a plurality of jewel nozzles 17' are provided instead of the single nozzle 17 shown in the first example.

We claim:

1. A piezo-electric ink jet droplet generator comprising:
   - a body part, said body part having a first ink supply passage, a protrusion having an end face, a second ink supply passage extending generally perpendicularly at a first end from said first passage through said protrusion and opening at said end face;
   - a piezo-electric crystal attached to said body part closely spaced from said first ink supply passage and adjacent said end of said second ink supply passage which connects with said first supply passage;
   - a cap secured to said end of said protrusion and having a nozzle mounted in said cap, said nozzle being in alignment with said second supply passage, and said cap having an inner end face surrounding said nozzle spaced from said end face of said protrusion, thereby defining, immediately adjoining said nozzle, a disk shaped chamber for ink between said inner face of said cap and said end face of said protrusion;
   - a flexible seal between said inner end face of said cap and said end face of said protrusion; and
   - non-threaded quick-release coupling means on said protrusion and said cap adapted for mounting said cap on said protrusion.

2. A piezo-electric ink jet droplet generator according to claim 1, wherein said quick-release coupling means comprises a bayonet type coupling having pins on said cap and respective engaging slots on said protrusion.

3. A piezo-electric ink jet droplet generator according to claim 1, wherein said quick-release coupling means comprises a bayonet type coupling having pins on said protrusion and respective engaging slots on said cap.

4. A piezo-electric ink jet droplet generator according to claim 1, wherein said first ink supply passage and said second ink supply passage form together a substantially T shaped passage having an arm and a leg, said second ink supply passage being formed by said leg of said T.

5. A piezo-electric ink jet droplet generator according to claim 4, wherein said first ink supply passage has an inlet port at one end of said arm of said T, and a bleed/flushing port at the other end of said arm.

6. A piezo-electric ink jet droplet generator according to claim 1, wherein said body part includes a thin-walled portion, said piezo-electric crystal being positioned axially aligned with said second supply passage and separated from said first supply passage by said thin walled portion.

* * * * *